(12) United States Patent
Lin

(10) Patent No.: US 7,624,479 B1
(45) Date of Patent: Dec. 1, 2009

(54) CARRIER BOARD SUPPORTING DEVICE

(76) Inventor: Ruei-Hsing Lin, 5F., No. 8, Sec. 1, Chung Hsing Rd., Wu Ku Hsiang, Taipei Hsien (TW)

( * ) Notice: Subject to any disclaimer, the term of this patent is extended or adjusted under 35 U.S.C. 154(b) by 0 days.

(21) Appl. No.: 12/147,510

(22) Filed: Jun. 27, 2008

(51) Int. Cl.
*B65D 63/14* (2006.01)

(52) U.S. Cl. ............. 24/135 N; 24/136 B; 248/682

(58) Field of Classification Search .............. 248/682, 248/230.2, 231.31; 24/135 N, 135 R, 135 A, 24/136 B; 403/409.1, 369, 385; 294/102.1; 439/792, 793, 798

See application file for complete search history.

(56) References Cited

U.S. PATENT DOCUMENTS

| | | | | |
|---|---|---|---|---|
| 508,684 | A | * | 11/1893 | Couch ................... 182/100 |
| 541,680 | A | * | 6/1895 | Price ...................... 74/579 R |
| 2,506,010 | A | * | 5/1950 | Birkenmaier ............. 439/803 |
| 3,072,881 | A | * | 1/1963 | Norris ....................... 439/811 |
| 3,339,174 | A | * | 8/1967 | Walter et al. ............. 439/793 |
| 4,911,572 | A | * | 3/1990 | Williams ................... 403/209 |

* cited by examiner

*Primary Examiner*—Korie Chan
(74) *Attorney, Agent, or Firm*—Leong C. Lei

(57) ABSTRACT

The present invention provides a carrier board supporting device, and particularly an improved structure of a hardware piece for hanging and supporting a carrier board on a steel cable or a support bar. A force-application piece is additionally provided between a body and a threaded fastening element of the supporting device in order to improve the fastening force, safety of assembling, regularity of assembled support device and the steel cable, and reduction of damage to the surface of the steel cable or support bar. Thus, the supporting device of the present invention features fast installation, surface-type fastening, and separation resistance and can be used in wide applications.

1 Claim, 5 Drawing Sheets

CARRIER BOARD SUPPORTING DEVICE

BACKGROUND OF THE INVENTION (a) Technical Field of the Invention

The present invention relates to a device for hanging or supporting a carrier board, which is aimed to removes the concerns regarding safety, insufficient fastening force, damage caused on the surface of a steel cable or support bar by single point fastening, and loss of regularity of the cable caused by single point fastening, which occur in the conventional carrier board hanging device that only relies on a threaded fastening element to generate a single point fastening force.

In the technique field and applications of the present invention, the device of the present invention is a hardware piece that is devoted to hanging a carrier board or rack. The hardware piece or supporting device is applicable to a steel cable or a support bar and can be efficiently mounted to/dismounted from the steel cable or support bar in accordance requirements regarding difference and variation in altitude for supporting, in a hanging manner, an object or serving as exhibition for advanced creations, thereby efficiently exploit the use of space. Thus, in the supporting device of the present invention, the hardware piece can be made for realizing single-direction interconnection, dual-direction interconnection, vertical interconnection, or specific-direction interconnection of the carrier board or rack, having various configurations and functionalities, yet the primary structure of the body of the hardware piece is still within the idea of inducing a fastening force against a steel cable or a support bar. The present invention is developed on the basis of such an issue to provide an important improvement of the supporting hardware piece.

The improvement of the present invention generally resides on the arrangement of a force-application piece between a body of the supporting device and a threaded fastening element in order to make improvements on the fastening force of the assembling of the supporting device, the safety of assembling, the regularity of the steel cable after being fastened, and avoiding damaging the surface of the steel cable or support bar, thereby imposing brand new functions and advanced assembling and use to and supporting device of this kind, together with consideration of safety, wherein the force-application piece of the present invention shows the following structural features:

(1) The force-application piece is set in the form of a plate and forms a centrally recessed space and uses the recessed space to provide a threaded fastening element with the most suitable accommodation space and the optimum force application point to thereby maximizing the degree of uniformity of fastening force.

(2) The plate configuration of the force-application piece has upper and lower ends respectively forming slanting lead-in faces for leading in and fast and correctly positioning a steel cable when the steel cable is fit through the force-application piece.

(3) The plate configuration of the force-application piece has a force-application face, which is set opposing the steel cable or the support bar and is of a hooping and fitting configuration in the form of a concave notch, which effects hooping and fitting on the steel cable and support bar and also increases the contact area of hooping and fitting of the force application piece thereby effectively and reliably enhances the hooping and fitting force.

(b) Description of the Prior Art

The use and arrangement of hang exhibitions are getting popular in for example companies, stores, art galleries, shopping malls, shopping centers, public places, stations, or even government organizations and they can be in various forms and become an important item for advertisement, exhibition, and even decoration. Thus, besides the major use of hanging exhibitions, the hanging type support or carrier is commonly accepted in various applications. The early hanging type arrangement and/or construction is often done by tying ropes or wires, which often leads to safety problems and various troubles. Thus, such an arrangement is discarded by the industry and the general consumers. To put progress and development of the hanging type support or carrying, hardware pieces for hanging have been developed and available in the market. In respect of hanging with a cable or a support bar, the hardware piece plays a critical role and also provides functionality in the respects of aesthetics, practicability, and safety. Thus, for a hardware piece for hanging purposes, besides being delicate and good-looking, four primary concerns must be taken into consideration, including: ease assembling of the structure, load-carrying capacity of the structure, durability, and safety.

Currently, a hardware piece or supporting device (A10) dedicated for use with a steel cable or a support bar is available in the market, and an example is shown in FIG. 1. The supporting device (A10) comprises a body (A1) and a threaded fastening element (A2). The body (A1) has a front portion forming a constrained clamping slot (A11) for clamping and securing an edge of a carrier board or rack (not shown) therein. The body (A1) also has a rear portion in which a semi-circular channel (A12) is formed by machining in a transverse direction. The semi-circular channel (A12) is of an open configuration with an internally threaded hole (A13) is formed by vertically drilling a central portion thereof for threadingly receiving and engaging the threaded fastening element (A2) to thereby directly secure to the steel cable (B) or a support bar received therein.

As shown in FIG. 2, when the conventional supporting device (A10) receives the steel cable (B) in the semi-circular open channel (A12) or a support bar fit therein, the steel cable (B) or the support bar will initially abut against and follow the channel (A12), maintaining a straight condition. However, since the formation of the threaded hole (A13) by drilling inevitably leaves a drill bit indent (A14) inside the body (A1), when the threaded fastening element (A2) is tightened, the steel cable (B) is subjected to depression of the threaded fastening element (A2), causing skewing or twisting, which leads to irregularity of the structure and influences the structural stability and safety of the hung carrier board.

Further, fastening of the conventional supporting device (A10) to the steel cable (B) or a support bar is realized a threaded fastening element (A2) that is fastened in a direct and perpendicular manner. This often causes damage to the surface of the steel cable (B) or the support bar due to the forcible fastening operation, leading to a fastening mark or a notch on the surface. Each time the fastening operation is performed, a new mark or new notch is formed, which may cause separation of filaments of the steel cable (B) in a short period, or induce corrosion of the support bar due to the notches formed on the surface thereof.

In addition, the conventional supporting device (A10) is only secured at a single point by a single threaded fastening element (A2), but has to carry the whole load of the carrier board. This only leads to concerns about safety. Unexpected loosening due to excessive load acting one the single fastening point may incur safety problem to surrounding people and also cause damage to valuable articles positioned on the carrier board. Consequently, the conventional hardware piece or supporting device (A10) does apparently not meet the requirements for load-carrying capacity, durability, and safety of the structure of the device.

SUMMARY OF THE INVENTION

The primary purpose of the present invention is to provide an improved structure for a carrier board (rack) supporting/hanging device that overcomes the drawbacks of the conventional hardware piece or supporting device and provides the supporting device with brand new functionality and enhanced safety together with features that satisfy the concerns regarding easy assembling, load carrying capacity, durability, and safety.

Structurally, the supporting device in accordance with the present invention comprises a body, a force-application piece, and a threaded fastening element, wherein the threaded fastening element functions to secure, via the force-application piece, the body to a steel cable or a support bar in altitude differing or varying manner for clamping and fixing a carrier board or rack thereby forming a hanging type carrier mechanism.

The design of the force-application piece in accordance with the present invention takes the following factors into consideration:

(1) The force-application piece has a force-application face and the force-application face is constructed to provide a hooping function, whereby by means of forcibly tightening of the threaded fastening element, a surface-type hooping and force application can be realized, which increases the contact area with the fastened object and thus notably improve fixing force and ensuring the safety of preventing separation and sliding.

(2) The force-application piece is set in a configuration having a centrally recessed space to provide the threaded fastening element with an optimum force application point and an accommodation space, ensuring maximum degree of uniformity of fixing force distribution and at the same realizing protection of the fastened object, such as the steel cable or the support bar, from damage induced on the surface thereof by the single-point fastening.

(3) Besides realizing the optimum arrangement of the threaded fastening element, the centrally recessed space of the force-application piece allows the force-application piece to be subjected to constraints imposed by the threaded fastening element in order to prevent the force-application piece from easily detaching and missing, thereby ensuring the force-application piece to be constantly retained in the semi-circular open channel defined in the body.

(4) Upper and lower ends of the force-application piece adopt a design of slanting lead-in face, which leads in and efficiently and correctly position the steel cable at the time the steel cable is fit through the force-application piece, whereby the assembling operation can be more efficient and reliable.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
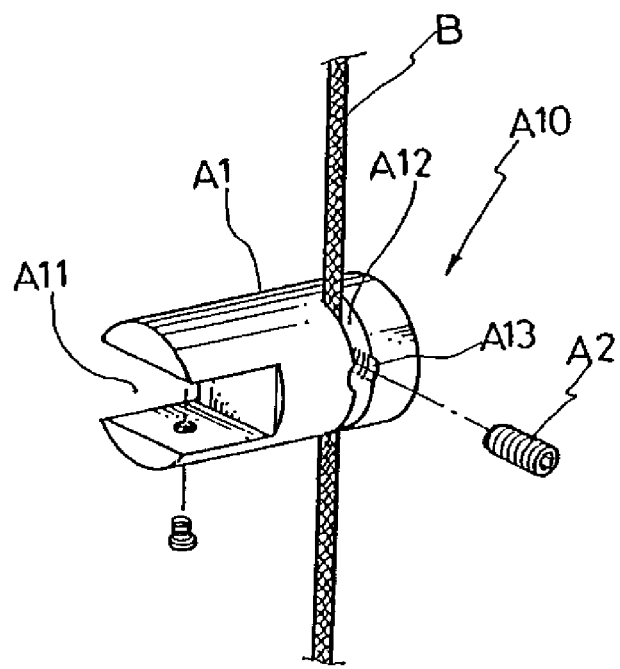
FIG. 1 is an exploded view showing a conventional carrier board supporting device mounted to a steel cable.
Figure 2:
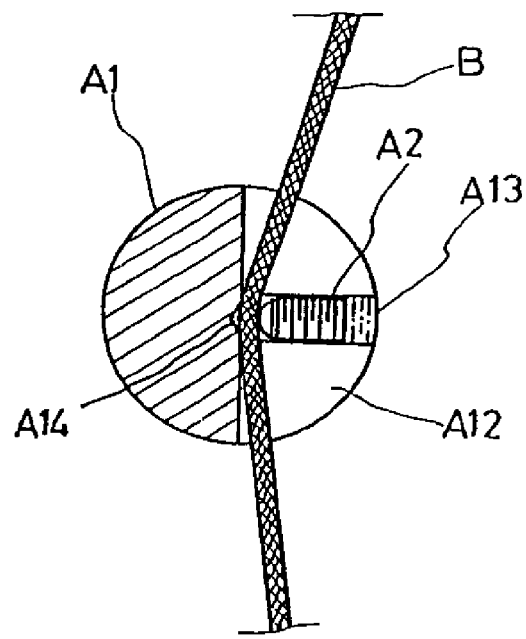
FIG. 2 is a cross-sectional view of the conventional supporting device illustrating the forcible engagement between a fastening element and the steel cable.
Figure 3:
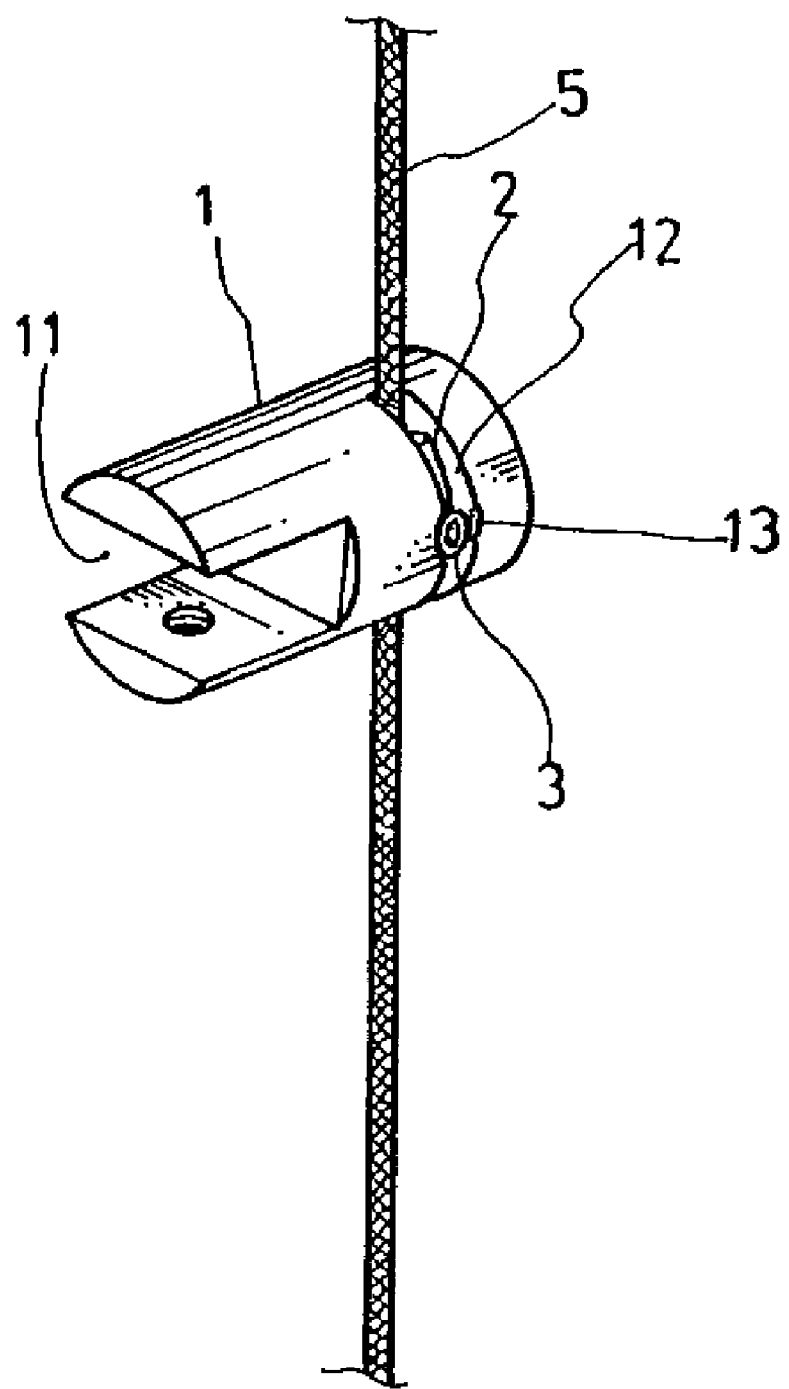
FIG. 3 is a perspective view showing a carrier board supporting device constructed in accordance with the present invention mounted to a steel cable.
Figure 4:
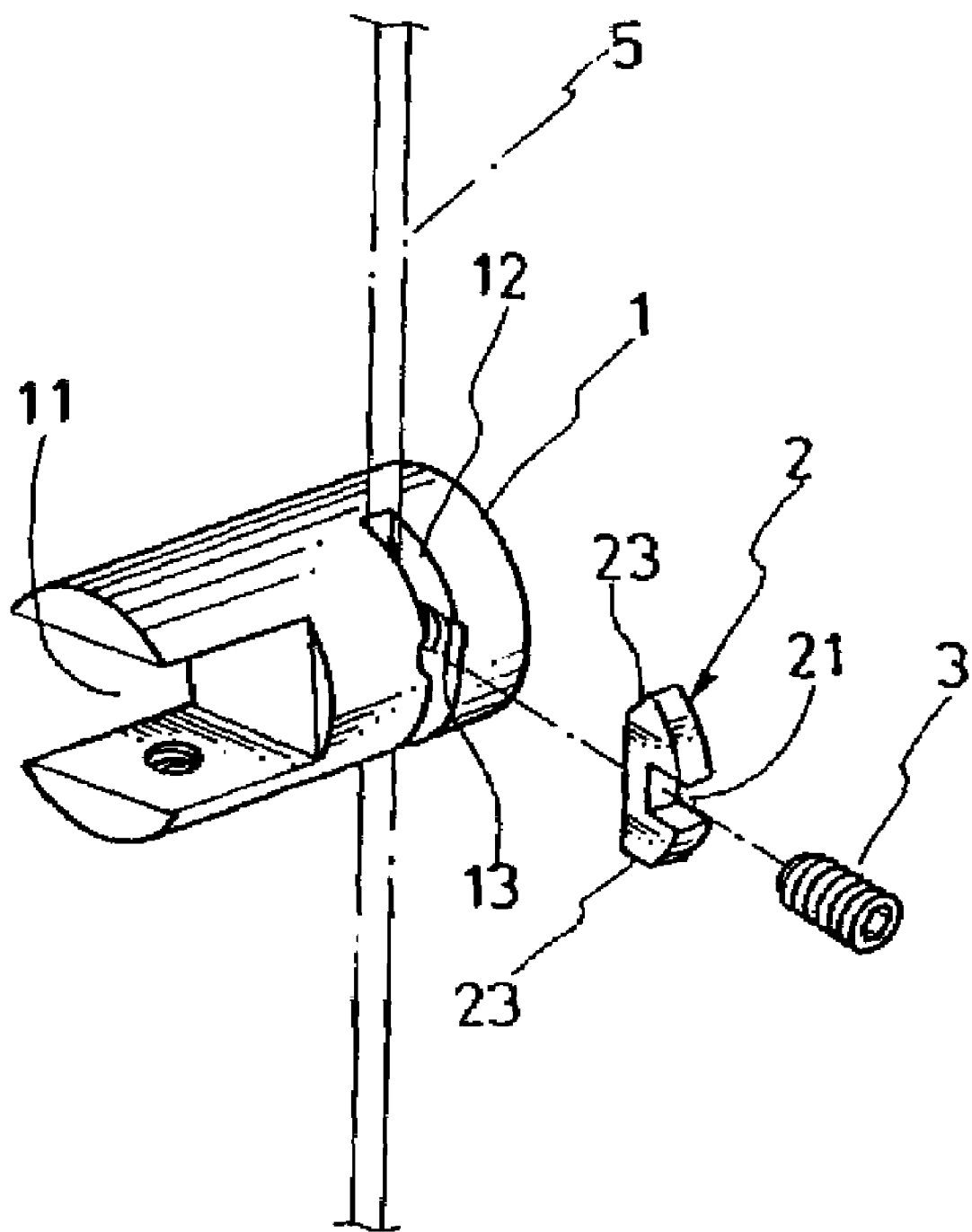
FIG. 4 is an exploded view of the carrier board supporting device of the present invention.
Figure 7:
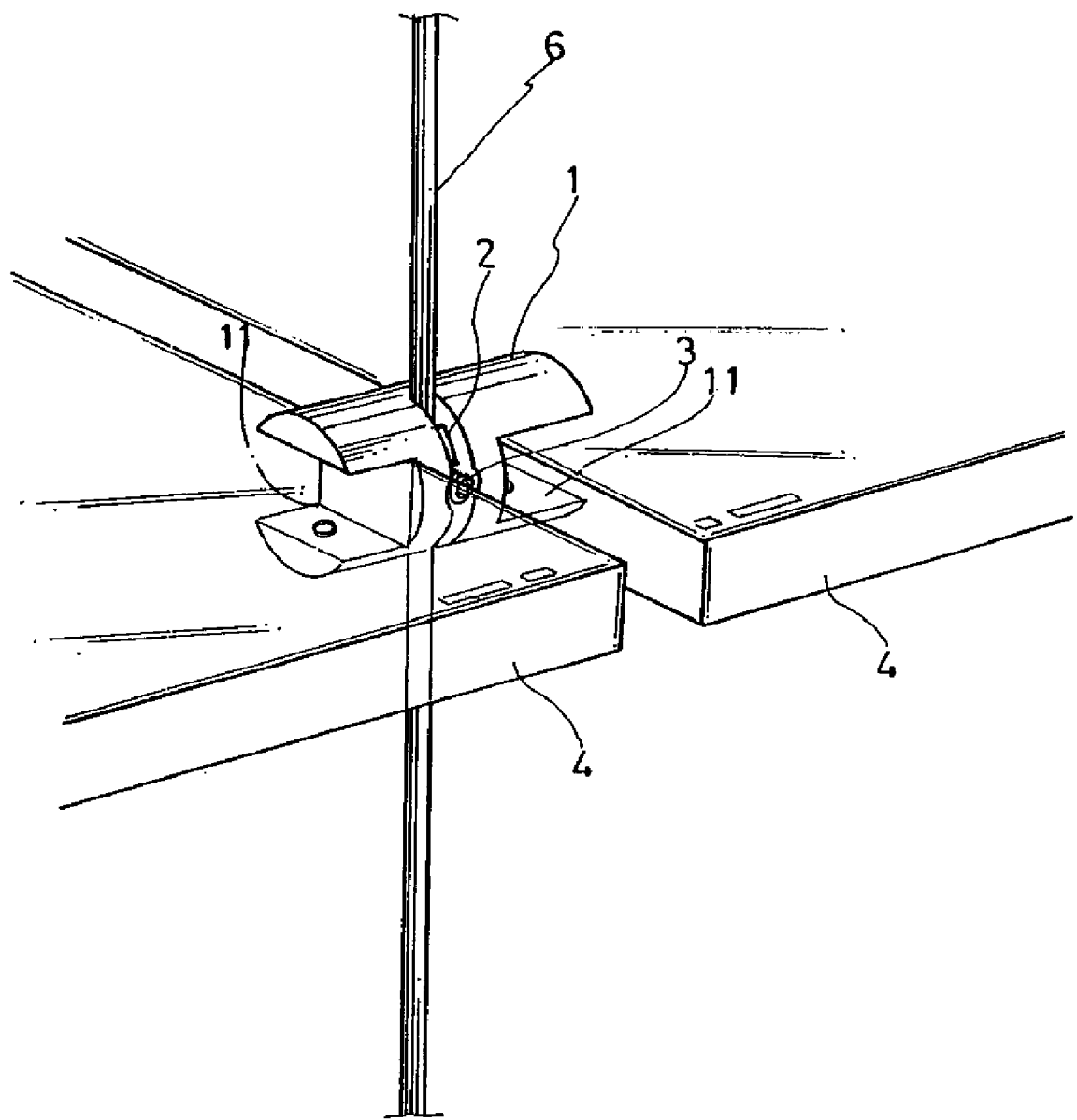
FIG. 7 is a perspective view illustrating an application of the carrier board supporting device of the present invention, which is mounted to a support bar.

With reference to the drawings and in particular to FIGS. 3 and 4, a carrier board supporting device constructed in accordance with the present invention comprises a body 1, a force-application piece 2, and a threaded fastening element 3. The body 1 is of a construction similar to the known devices, having a front portion forming a constrained clamping slot 11 for clamping and securing a carrier board 4 to thereby fix the carrier board 4, as shown in FIG. 7. The body 1 also has a rear portion in which a semi-circular open channel 12 is formed by machining in a transverse direction. An internally threaded hole 13 is centrally and vertically formed in the semi-circular open channel 12 for effecting fastening by means of the threaded fastening element 3 via the force-application piece 2 to thereby realize fixing to a steel cable 5 or a support bar 6.

The body 1 of the supporting device in accordance with the present invention can be of configuration that is changeable with respect to various carrier board 4, including for example single-direction interconnection, as shown in FIG. 3, dual-direction interconnection, as shown in FIG. 7, vertical interconnection, or specific-direction interconnection. However, the general construction maintains the essential feature of fixing to the steel cable 5 or the support bar 6. Thus, the primary feature of the present invention resides on the connection relationship among the body 1, the force-application piece 2, and the threaded fastening element 3.

Figure 5:
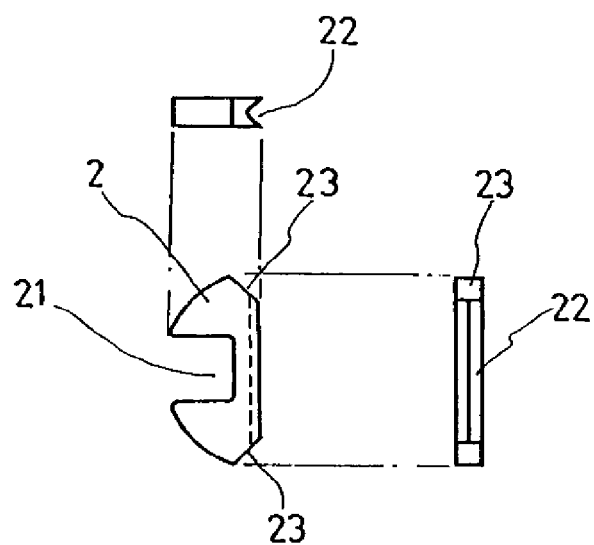
FIG. 5 shows a side elevational view, a front view, and a top view of a force-application piece of the carrier board supporting device of the present invention.

Also referring to FIG. 5, the force-application piece 2 is in the form of a plate having a thickness slightly smaller than width of the semi-circular open channel 12 of the body and has a configuration that forms a recessed space 21 in a central portion thereof to provide the threaded fastening element 3 with a most suitable accommodation space and an optimum force application point, whereby the degree of uniformity of application of fastening force can be made maximum and the force-application piece 2 is effectively constrained from departing from the semi-circular open channel 12 that is machined in the body 1 and thus getting missed.

The force-application piece 2 has a force-application face that opposes the steel cable 5 or the support bar 6 and the force-application face is of a hooping and fitting configuration in the form of a concave notch 22 that effects fitting and hooping of the steel cable 5 or the support bar 6 and also increases a hooping area of the force-application piece 2 against the steel cable 5 or the support bar 6 to thereby reliably enhance the hooping stress.

Figure 6:
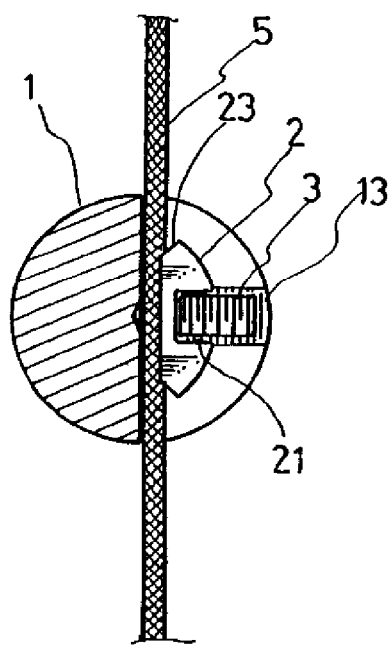
FIG. 6 is a cross-sectional view of the carrier board supporting device of the present invention mounted to a steel cable.

Also referring to FIG. 6, the force-application piece 2 has upper and lower ends respectively forming slanting lead-in faces 23, which lead in and efficiently and correctly position the steel cable 5 at the time the steel cable 5 is fit through the force-application piece 2, whereby the assembling operation can be more efficient and reliable. Particularly, once the threaded fastening element 3 is tightly fastened, the concave-notch hooping structure 22 of the force-application piece 2 helps maintaining the steel cable 5 in a constant and straight configuration, ensuring the regularity and straightness of the supporting device fastened to the steel cable 5.

To conclude, the present invention effectively solves the problems that have long existed in the conventional devices of this kind and this purpose and provides a brand new functionality that meets the four primary concerns of ease assembling of structural body of the device, load-carrying capacity of the structural body of the device, durability of the device, and safety of the device.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A carrier board supporting device comprising:

a body having a front portion and a rear portion, said front portion being formed with a constrained clamping and securing a carrier board, said rear portion being formed with a semi-circular open channel, an internally threaded hole being centrally and vertically formed in said semi-circular open channel;

a force-application piece having a thickness smaller than width of said semi-circular open channel of said body, said force application piece having a central portion provided with and on a side opposite said recessed space having a force-application face that opposes a steel cable, said force-application face having a concave notch that effects fitting and hooping of said steel cable and increases a hooping area of said force-application piece against said steel cable to thereby enhance hooping stress, said force-application piece having upper and lower ends respectively forming slanting lead-in faces which lead in and correctly position said steel cable when said steel cable is fit through said force-application piece; wherein said slanting lead-in face of the upper end slanting downward to said concave notch and said slanting lead-in face of the lower end slanting upward to said concave notch; and a threaded fastening element tightened to said internally threaded hole via said force-application piece with said threaded fastening element accommodated in said recessed space of said force-application piece.

\* \* \* \* \*